(12) United States Patent
Park

(10) Patent No.: US 8,000,172 B2
(45) Date of Patent: Aug. 16, 2011

(54) TIME CONTROL APPARATUS AND METHOD OF MANAGING TIME WITHIN SAID TIME CONTROL APPARATUS

(75) Inventor: Won-Jong Park, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 11/895,426

(22) Filed: Aug. 24, 2007

(65) Prior Publication Data

US 2008/0259735 A1   Oct. 23, 2008

(30) Foreign Application Priority Data

Apr. 19, 2007   (KR) .................. 10-2007-0038522

(51) Int. Cl.
*G04C 11/00* (2006.01)
(52) U.S. Cl. .......................................... 368/46; 340/652
(58) Field of Classification Search ................ 368/46, 368/10, 47; 365/228; 340/7.3, 7.37, 7.38, 340/652
See application file for complete search history.

(56) References Cited

U.S. PATENT DOCUMENTS

| | | | | |
|---|---|---|---|---|
| 4,168,531 A | * | 9/1979 | Eichelberger et al. | 713/502 |
| 5,359,577 A | * | 10/1994 | Hoshino et al. | 368/67 |
| 5,596,512 A | | 1/1997 | Wong et al. | 364/550 |
| 5,831,347 A | * | 11/1998 | Landis et al. | 307/64 |
| 6,711,908 B2 | * | 3/2004 | Ferragut et al. | 62/129 |
| 2005/0110880 A1 | * | 5/2005 | Parulski et al. | 348/231.5 |
| 2005/0122841 A1 | * | 6/2005 | Yanase | 368/10 |
| 2005/0162981 A1 | * | 7/2005 | O'Neill et al. | 368/46 |

FOREIGN PATENT DOCUMENTS

| | | |
|---|---|---|
| EP | 1160637 | 12/2001 |
| KR | 2003-47494 | 6/2003 |
| KR | 2004-18044 | 3/2004 |
| KR | 2007-38373 | 4/2007 |
| WO | WO 00/38338 | 6/2000 |

* cited by examiner

*Primary Examiner* — Sean Kayes
(74) *Attorney, Agent, or Firm* — Cha & Reiter, LLC

(57) ABSTRACT

A time control apparatus, which is not equipped with an auxiliary batter for real time control, includes a time information memory for storing real time information updated for a user; and a real time controller, in response to powering on, if the real time information stored in the time information memory is earlier than time information of the real time controller, displaying the real time information of the real time controller to a user and simultaneously updating the real time information in the time information memory without performing a time setting operation. It is possible to discern between a powering-off case where the battery is not removed from the terminal and a powering-off case where the battery is removed from the terminal in order to avoid a time setting operation that is unnecessary to the user.

6 Claims, 2 Drawing Sheets

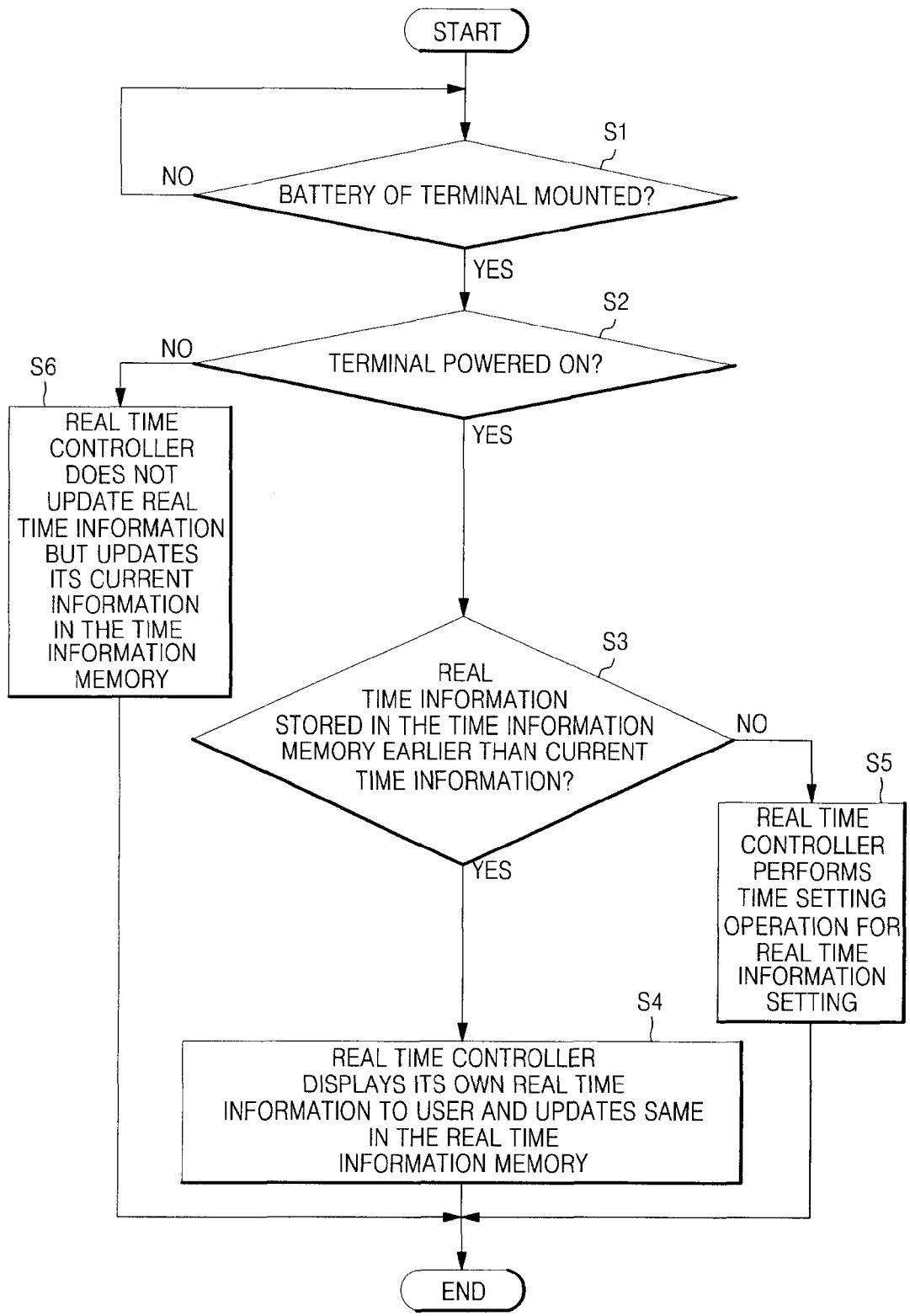

TIME CONTROL APPARATUS AND METHOD OF MANAGING TIME WITHIN SAID TIME CONTROL APPARATUS

CLAIM OF PRIORITY

This application makes reference to and claims all benefits accruing under 35 U.S.C. §119 from an application for "TIME CONTROL APPARATUS AND METHOD OF TERMINAL", earlier filed in the Korean Intellectual Property Office on Apr. 19, 2007, and there duly assigned Serial No. 2007-0038522.

BACKGROUND OF THE INVENTION

The present invention relates to a time control apparatus and its method in a terminal.

In general, terminals have a real time controller for maintaining time control. A real time controller is designed to ensure constant time control in conjunction with an auxiliary battery, which powers the real time controller, even when power is not supplied from a main battery of the terminals.

However, some terminals do not use such an auxiliary battery for powering the real time controller, and instead use power supplied from the main battery.

In the terminal which is powered by the main battery as mentioned above, the setting of a real time controller must be changed by the user or reset by the real time information received from a GPS (Global Positioning Satellite) and the like, each time the main battery is replaced.

That is, when the user turns on the power of the terminal again after the main battery has been replaced, the terminal performs a process for setting time information and provides a User Interface (UI) for time setting. As the user sets up a time via the UI, the time is maintained until the power from the battery is removed.

Then, when the main battery is removed from the terminal and mounted again to power the terminal, the terminal repeats the aforementioned operation to update time information.

However, there is no clear indication whether or not the main battery was removed prior to the terminal being powered on. Thus, the aforementioned operation must be performed whenever the terminal is powered on.

Accordingly, in the terminal which is powered only by the main battery, if real time information is not provided through the GPS or NITZ service, the user must repeatedly input time information whenever the terminal is turned on again.

SUMMARY OF THE INVENTION

The present invention has been made to solve the foregoing problems of the prior art and provides additional advantages, by providing a time control apparatus and its method capable of discerning whether or not the power is turned off in response to a main battery being removed from the terminal, which is not equipped with an auxiliary battery for powering a real time controller, so that it can avoid a time setting operation that is unnecessary to users.

According to an aspect of the invention, the time control apparatus of a terminal, which does not have an auxiliary battery for real time control, includes a time information memory storing real time information updated to a user; and a real time controller, which in response to powering on of the terminal, determines if the real time information stored in the time information memory is earlier in time than time information of the real time controller, displaying the real time information of the real time controller to a user and simultaneously updating the real time information in the time information memory without performing a time setting operation.

Preferably, in a case power is turned off, if the battery of the terminal is mounted thereon and the terminal is powered by the battery, the terminal may update real time information of the terminal and retains the updated real time information as time information, and if the battery of the terminal is removed and the terminal is not powered from the battery, the terminal may retain initially set time information as time information.

Preferably, the real time controller provides preset time information to the user and updates the real time information in the time information memory at every preset time.

According to another aspect of the invention, the time control method of a terminal, which does not have an auxiliary battery, includes: a real time controller discerning whether or not a battery of the terminal is mounted; and if the battery of the terminal is mounted, determining whether or not the terminal is powered on; and if the terminal is powered on, discerning whether or not real time information stored in a time information memory is earlier than time information of the real time controller; and if the real time information stored in the time information memory is earlier than the time information of the real time controller, displaying the real time information of the real time controller to a user and simultaneously updating the real time information in the time information memory without performing a time setting operation.

The time control method may further include: if the real time information stored in a time information memory is not earlier than the time information of the real time controller, executing a time setting operation to set up the real time information.

The time control method may further include: in a case power is turned off, determining if the battery of the terminal is mounted on the terminal to power the terminal, updating real time information of the terminal and setting the updated real time information as time information; and if the battery of the terminal is removed and the terminal is not powered from the battery, setting initially set time information as time information.

The time control method may include: providing preset time information to the user; and updating the real time information in the time information memory at every preset time.

The time control method may further include: if the terminal is not powered on, updating the real time information of the real time controller without updating the same in the time information memory.

BRIEF DESCRIPTION OF THE DRAWINGS

The above features and other advantages of the present invention will be more clearly understood from the following detailed description taken in conjunction with the accompanying drawings, in which:

FIG. 2 is a flowchart illustrating a time control method of a terminal according to the present invention.

DETAILED DESCRIPTION OF THE INVENTION

Figure 1:
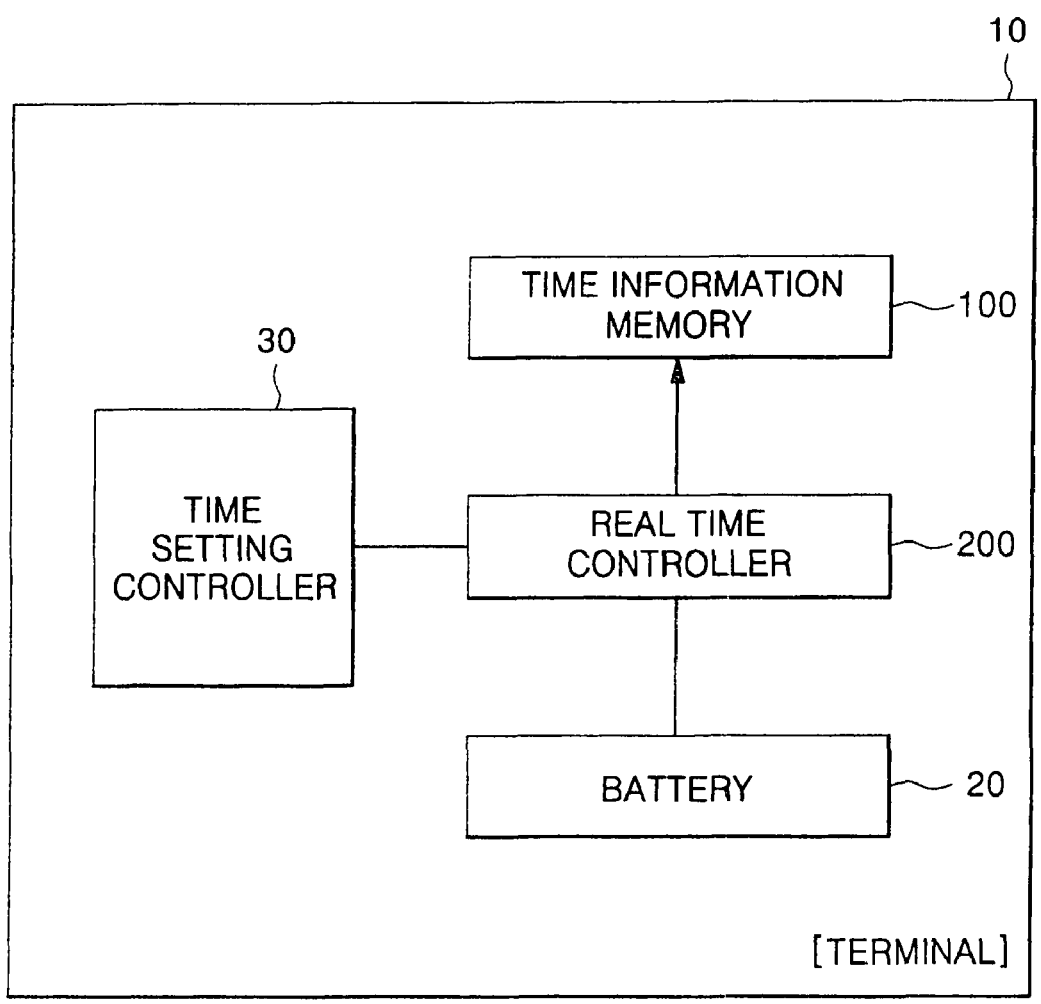
FIG. 1 is a functional block diagram illustrating the structure of a time control apparatus of a terminal according to the present invention.

Hereinafter detailed description will be given of time control apparatus and method of a terminal according to the invention with reference to the accompanying drawings. The system construction as described hereinafter is an example selected to illustrate the present invention and it will be apparent to those skilled in the art that the present invention shall not be limited by such an example.

FIG. 1 is a functional block diagram illustrating the structure of a time control apparatus according to the present invention. As shown, the inventive time control apparatus includes a time information memory 100, real time controller 200, a battery 20 for powering a terminal 10, and a time setting controller 30 for providing a user with a user interface for real time setting. It should be noted a terminal within the context of this disclosure includes a mobile phone, and other mobile computer devices, such as a personal digital assistant (PDA), a personal communication assistant (PCA), an electronic organizer, an interactive TV/set-top box remote control, or any duplex interactive devices.

The real time memory 100 stores real time information which is updated for the user.

As the terminal 10 is powered on, the real time controller 200, determines if time information thereof is later in time than real time information stored in the time information memory 100, and does not perform a time setting operation but displays the real time information thereof to the user and, at the same time, updates time information thereof to the time information memory 100. In a case where the battery 20 is mounted on the terminal 10, and when the terminal 10 is powered off, the real time controller 200 is powered from the battery 20 mounted on the terminal 10. Then, the real time controller 200 updates real time information thereof and, real time information is updated in the time information memory as real time information thereof. In a case where the battery 20 is removed from the terminal 10, the real time controller 200 is not powered from the battery 20. Then, the real time controller 200 discerns initially set time information as time information thereof, provides real time to the user based on preset time information, and updates real time information to the time information memory 100 at every preset time point.

For the purposes of clarity and simplicity, general functions and detailed operations of the aforementioned components will not described further but those functions essential to the present invention will be described mainly.

First, the real time controller 200 discerns whether or not the battery 20 of the terminal 10 is removed.

If the battery 20 is mounted on the terminal 10, it is discerned whether the terminal 10 is powered on or off.

If the terminal 10 is powered on, the real time controller 200 compares preset base information with real time information stored in the time information memory 100. In the case where the terminal 10 is initially powered on as mentioned above, the time information memory 100 does not have time information provided from the real time controller 200, and thus displays a preset base time to the user while storing the base time in the time information memory 100.

Next, the real time controller 200 performs a time setting operation by the user. In response to the time setting by the user, the real time controller 200 sets up a real time based on time information set by the user and updates real time information in the time information memory 100 at a preset period.

In general, when power, is turned off, and if the battery 20 is not removed from the terminal 10, the real time controller 200 is powered by the battery 20. Therefore, the real time controller 200 processes real time set by the user but does not update real time information in the time information memory 100.

If it is converted from a battery-off state where the battery 20 is removed from the terminal 10 so as not to supply power thereto into a battery-on state where the terminal 10 is mounted with and powered by the battery 20, the real time controller 200 compares real time information stored in the time information memory 100 with time information thereof.

Here, the real time controller 200, if time information thereof is earlier than real time information stored in the time information memory 100, the real time controller 200 executes time setting operations for the user to set up a real time.

In the meantime, if the terminal 10 is powered off and then powered on in a state where the battery 20 is not removed from the terminal 10, the real time controller 200 compares real time information stored in the time information memory 100 with time information thereof.

Here, the real time controller 200, if time information thereof is later than real time information stored in the time information memory 100, does not perform the time setting operation but displays real time information thereof and, at the same time, updates time information thereof in the time information memory 100.

In a case where the battery 20 is mounted on the terminal 10, when the terminal 10 is powered off, and the real time controller 200 is powered from the battery 20 mounted on the terminal 10, then the real time controller 200 updates real tint information thereof and, at the same time and discerns real time information updated as real time information thereof. In a case where the battery 20 is removed from the terminal 20, the real time controller 200 is not powered from the battery 20. Then, the real time controller 200 discerns initially set time information as time information thereof, provides real time to the user based on preset time information, and updates real time information to the time information memory 100 at every preset time point.

The time control method of a terminal configured above according to the invention will now be described with reference to FIG. 2.

First, in S1, the controller 200 determines whether or not the battery 20 of the terminal 10 is mounted.

If the battery 20 of the terminal 10 is mounted (YES) as a result of step S1, the real time controller 200 determines whether or not the terminal 10 is powered on in S2.

If the terminal 10 is powered on (YES) as a result of step S2, the real time controller 200 determines whether or not time information stored in the time information memory 100 is earlier in time than time information thereof in S3.

If time information stored in the time information memory 100 is earlier in time than time information of the real time controller 200 (YES) as a result of step S3, the real time controller 200 does not perform a time setting operation but displays real time information thereof to the user and updates the same in the time information memory 100 in S4.

If real time information is not earlier than time information of the real time controller 200 (NO) as a result of step S4, the real time controller 200 performs the time setting operation in order to set up real time information in S5.

On the other hand, if the terminal 10 is powered off (NO) as a result of step S2, the real time controller 200 does not update real time information in the time information memory 100 but updates time information thereof in the time information memory 100 in S6.

In a case where the battery 20 is mounted on the terminal 10, when the terminal 10 is powered off, the real time controller 200 is powered from the battery 20 mounted on the terminal 10. Then, the real time controller 200 updates real time information thereof and, at the same time and retains real time information updated as real time information thereof. In a case where the battery 20 is removed from the terminal 20, the real time controller 200 is not powered from the battery

20. Then, the real time controller 200 sets an initially set time information as time information thereof.

Then, the real time controller 200 provides real time to the user based on preset time information, and updates real time information to the time information memory 100 at every preset time point.

According to the teachings of the present invention, in a terminal where an auxiliary battery in use for internal time information management is not equipped, it is possible to discern between a powering-off case where a battery is not removed from the terminal and a powering-off case where the battery is removed from the terminal in order to avoid a time setting operation that is unnecessary to the user.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been shown and described in connection with the preferred embodiments, it will be apparent to those skilled in the art that modifications and variations can be made without departing from the spirit and scope of the invention as defined by the appended claims.

What is claimed is:

1. A time control terminal including a main battery and not being equipped with an auxiliary battery for real time control, comprising a processor, a display unit, and a memory; the processor is configured to:
   measure current time and update a current time value stored in the memory according to said time measurement;
   display the current time to a user on the display unit and to store a time value in the memory corresponding to the current time sent to the display unit;
   when the battery is removed and then mounted back, store a default set time in the memory as the time value, the default set time being earlier in time than the current time value; and
   during powering on, determine whether the time value stored in the memory is earlier than the current time value stored in the memory, and if so, determines that the main battery has not been removed and does not perform a time setting operation, and if not, determines that the main battery has been removed and performs a time setting operation.

2. The terminal according to claim 1, wherein the processor is further configured to update the time value in the memory at a preset time period.

3. The terminal according to claim 1, wherein the processor is further configured to be powered by the main battery when the terminal is powered off.

4. A time control method in a terminal having a main battery and not equipped with an auxiliary battery, the terminal further including a processor, a display unit, and a memory, comprising:
   measuring current time and updating a current time value stored in the memory according to said time measurement;
   displaying the current time to a user on the display unit and storing a time value in the memory corresponding to the current time sent to the display unit;
   when the battery is removed and then mounted back, storing a default set time in the memory as the time value, the default set time being earlier in time than the current time value; and
   determining whether the time value stored in the memory is earlier than the current time value stored in the memory during powering on, and if so, determining that the main battery has not been removed and not performing a time setting operation, and if not, determining that the main battery has been removed and performing a time setting operation.

5. The method according to claim 4, comprising updating the time value in the memory at a preset time period.

6. The method according to claim 4, wherein the processor is further configured to be powered by the main battery when the terminal is powered off.

* * * * *